Sept. 20, 1932.                C. H. VICKERY                1,878,035
              INDICATING MECHANISM FOR MOTOR CARS AND THE LIKE
                          Filed Dec. 15, 1931
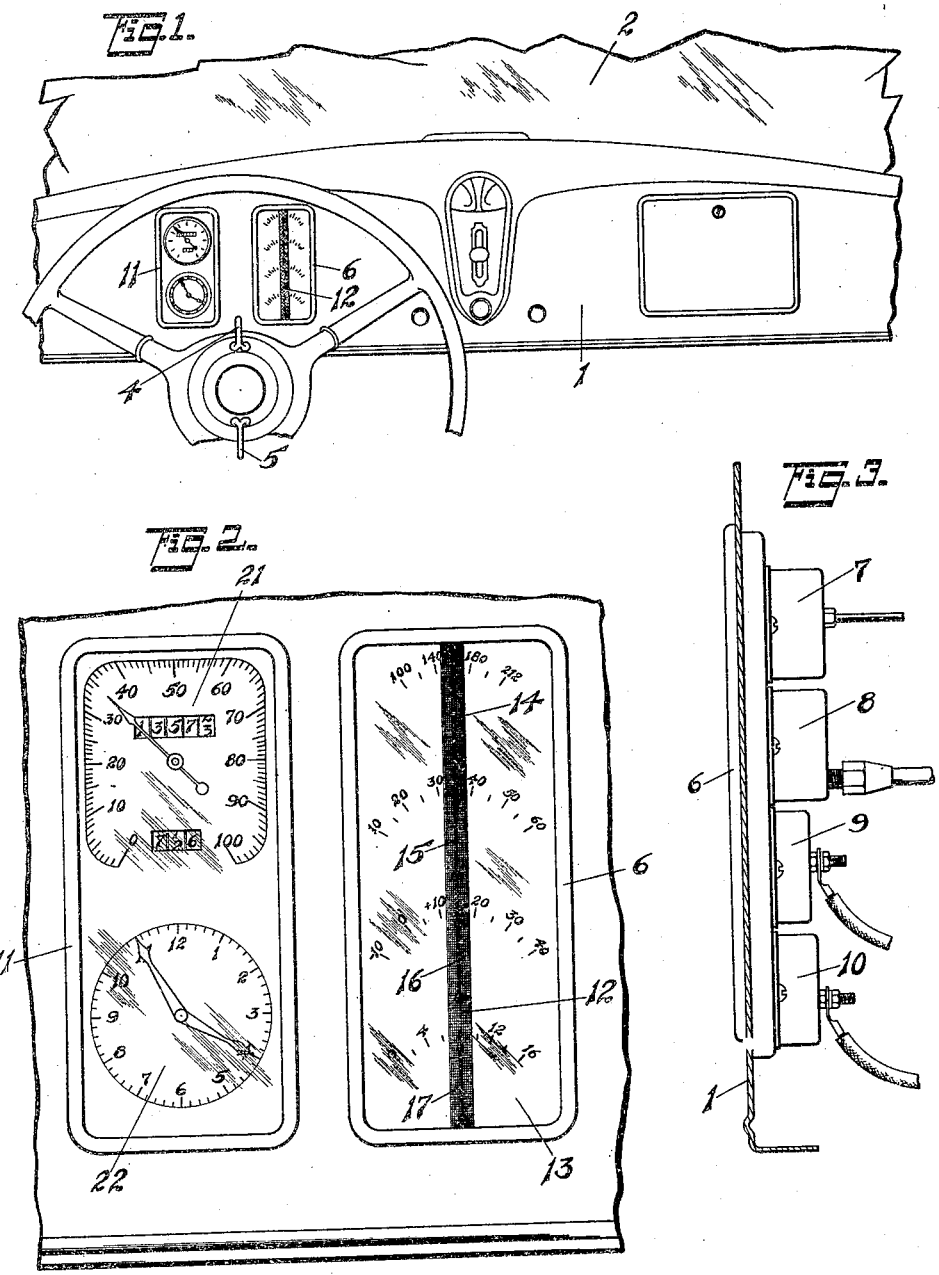
INVENTOR
Charles H. Vickery
BY
ATTORNEYS Patented Sept. 20, 1932

1,878,035

UNITED STATES PATENT OFFICE

CHARLES H. VICKERY, OF PITTSFIELD, MASSACHUSETTS

INDICATING MECHANISM FOR MOTOR CARS AND THE LIKE

Application filed December 15, 1931. Serial No. 581,162.

This invention relates to certain improvements in means for supporting or mounting a plurality of visible indicators, such as the various indicating mechanisms used in motor cars, motor boats and the like.

In the construction commonly used for mounting the various indicators necessary for indicating the proper operation of the mechanism of a motor car, boat or the like, the instruments are separately mounted in a support which is usually designated as the dash or the dashboard of the car or boat, these instruments being strung along the support so that it is necessary for the driver to look at each instrument separately or individually to determine whether it is properly functioning or not, and this requires, particularly in the case of an automobile driver, that he has to take his eyes from the road for an appreciable time. This necessity of having to look at each instrument separately and the time the driver's eyes are off the road, which this inspection requires, are apt to result in serious accidents, particularly when the car is traveling at the relatively high speed which is now common in motor car operation.

It is the especial object of the present invention to provide an improved mounting for the various instruments that are necessarily used to determine the proper functioning of a motor car or the like in such a manner that the arrows or other indicating devices used are concealed when normally operating, but become visible when not normally operating, so that the operator can tell at a glance when the machine is properly functioning and does not have to remove his eyes from the road for any appreciable time.

A further object of the invention is to provide an improved construction of simple form in which all the instruments are mounted in one panel so that they are readily visible from the wheel or other control point.

It is a further object of the invention to provide a simple means for concealing the operation of the arrows or the like under normal operation, and permitting clear visibilty of the same when the machine is not properly functioning.

With these and other objects not specifically referred to in view, the invention consists in certain novel parts, arrangements and combinations, which will be fully described in connection with the annexed drawing and the novel features pointed out in the claims hereunto appended.

In the drawing,—

Figure 1 is a partly broken away front view of a part of a dash or dashboard showing the preferred arrangement of the improved indicating mechanism;

Figure 2 is a partly broken away view, on an enlarged scale, of the indicating mechanism shown in Figure 1, and Figure 3 is a partly sectional and partly broken away side view of the mechanism shown in the other figures.

Referring now to the drawing, the particular mechanism selected to illustrate the invention is the dash or dashboard of a motor car. It will be understood, however, that as to certain of these features the invention is entirely applicable to other uses, such as motor boats, aeroplanes, and in other situations where it is desirable to effect a quick reading of a plurality of indicating mechanisms.

In the construction illustrated, however, showing the dash for a motor car, this dash is indicated by the numeral 1 and a windshield of the conventional type is indicated by the numeral 2. The steering wheel of the car is marked 3 and the throttle and spark controls are marked 4 and 5.

In the preferred construction, the mechanism employed for indicating the proper operation of the mechanism of the motor car comprises a plurality of instruments which are grouped closely adjacent in a single panel, indicated generally by the numeral 6, supported by the dash, this mechanism including a water gauge 7, an oil gauge 8, an ammeter 9, and a gasolene gauge 10, these being provided with suitable indicia. This panel containing the mechanism is preferably arranged so that the indicating devices are arranged closely adjacent and vertical, but it will be understood that if desired the panel could be turned around so that these parts would be in a horizontal position instead of a vertical position. This panel is, furthermore, preferably arranged so that it is in front of the steering wheel and can readily be viewed by the driver either through the wheel or over the wheel, depending on the particular type of steering apparatus or arrangement of the driving wheel which may be used in the car.

In the preferred arrangement, furthermore, the speedometer 21 and clock 22, where a clock is used, are likewise conveniently arranged adjacent the indicating mechanism in a panel 11 arranged alongside closely adjacent the panel 6.

In accordance with the invention, the indicating devices or instruments per se are concealed or hidden when the mechanisms are functioning normally. If, however, one or more of the mechanisms is not functioning normally, the indicating device for that mechanism appears clearly visible on the panel, so that the driver or operator can tell at a glance which mechanism is not properly functioning and does not have to take his eyes from the road for any appreciable time, the mechanisms being so grouped that they can all be read at a glance.

The invention includes means for concealing the indicating devices when normally functioning and this is conveniently effected by painting or otherwise applying a band or stripe of an opaque or semi-opaque material 12 to the glass face 13 of the panel 6, so that it conceals the indicating mechanisms when these latter are normally functioning and as clearly shown in the figures. The specific type of indicating devices used for showing the functioning of the mechanisms of the car with which they are connected may, of course, be varied widely, but such devices are conveniently in the form of the conventional pivoted or swinging arrows, an arrow 14 being provided for the water gauge, an arrow 15 for the oil gauge, an arrow 16 for the ammeter, and an arrow 17 for the gasolene gauge, these being preferably arranged, as shown, in superposed relation behind the face 13 of the panel 6.

It will be seen that under ordinary road conditions, if any of these mechanisms are not properly operating, the arrow will move from behind the concealing band 12 and will be clearly visible to the operator on either side of this band, so that the operator can tell at a glance whether or not the car mechanism is functioning as it should.

While the concealing band or stripe or other concealing agency used may be opaque, in the best constructions this band or other concealing medium is semi-transparent, so that on close inspection this can be seen and the proper adjustment of the instruments may be made without removing the panel.

The details of the instruments have not been shown, as being unnecessary for an understanding of the invention, it being understood that such instruments may be of the usual or conventional type.

A further advantage of the construction disclosed is the provision of a clock and the speedometer in a panel closely adjacent to the panel containing the indicating devices, so that the operator of the vehicle can observe the operation of any of these mechanisms without taking his eyes from the road except momentarily.

It will be seen that with the construction disclosed in the present invention a very simple and effective arrangement for various indicating mechanisms has been provided, one which is of simple form and of few parts and which can be readily installed on a car or the like.

While the invention has been shown and described in its preferred form, it will be understood that certain changes and modifications may be made in the specific construction and arrangement of the parts without departing from the invention as defined in the appended claims.

What is claimed is:

1. In a device of the character described, the combination with a support, of a plurality of visible indicating mechanisms grouped closely adjacent on the support, and means concealing the indicating mechanisms from view when operating normally but permitting any of them to be viewed when not operating normally.

2. In a device of the character described, the combination with a support, of a plurality of visible indicating mechanisms grouped closely adjacent in alignment on the support, and means concealing the indicating mechanisms from view when operating normally but permitting any of them to be quickly read when not operating normally.

3. In a device of the character described, the combination of a support, a plurality of indicating mechanisms linearly grouped closely adjacent each other on the support, and a linear device covering the indicating mechanisms when they are operating normally but permitting any of them to be viewed when they move to indicate non-normal operation.

4. In a device of the character described, the combination of a support, a plurality of indicating mechanisms linearly grouped closely adjacent each other on the support, and a semi-transparent linear band covering the mechanisms when they are operating normally but permitting any of them to be viewed when they move to indicate non-normal operation.

5. In a device of the character described, the combination with a dash of a motor car, of an instrument panel mounted in the dash, a plurality of indicating mechanisms mounted in the panel in vertical alignment and closely adjacent, each of these mechanisms having a movable part, and a band covering the movable parts when normally operating but permitting them to be viewed when they move to either side of the band.

6. In a device of the character described, the combination with a dash of a motor car or the like, provided with a controlling mechanism for steering it, of a panel supported in the dash in front of the controlling mechanism, a plurality of indicating instruments grouped closely adjacent each other in the panel, and means concealing the instruments when operating normally but permitting any of them to be viewed when not operating normally.

In testimony whereof, I have hereunto set my hand.

CHARLES H. VICKERY.